United States Patent [19]

Takano

[11] Patent Number: 5,572,916
[45] Date of Patent: Nov. 12, 1996

[54] DESK-TOP CUTTING MACHINE

[75] Inventor: Shinji Takano, Fukushima, Japan

[73] Assignee: Hitachi Koki Haramachi Co., Ltd., Fukushima, Japan

[21] Appl. No.: 326,192

[22] Filed: Oct. 20, 1994

[51] Int. Cl.⁶ ........................................................ B26D 5/00
[52] U.S. Cl. ................................... 83/74; 83/72; 83/490; 83/471.3
[58] Field of Search ................................... 83/74, 76, 72, 83/490, 471.3, 581, 62.1; 318/779, 381, 432

[56] References Cited

U.S. PATENT DOCUMENTS

| | | | |
|---|---|---|---|
| 3,324,373 | 6/1967 | Stamm | 318/381 |
| 3,715,946 | 2/1973 | Kaltenbach | 83/72 |
| 4,823,067 | 4/1989 | Weber | 318/779 |
| 4,873,478 | 10/1989 | Weiss | 318/779 |
| 5,285,708 | 2/1994 | Bosten et al. | 83/490 |
| 5,296,795 | 3/1994 | Dropps et al. | 318/779 |
| 5,355,060 | 10/1994 | Peterson | 318/432 |

FOREIGN PATENT DOCUMENTS

| | | |
|---|---|---|
| 61-10991 | 1/1986 | Japan . |
| 61-180593 | 8/1986 | Japan . |

Primary Examiner—Rinaldi I. Rada
Assistant Examiner—Allan M. Schrock
Attorney, Agent, or Firm—Sughrue, Mion, Zinn, Macpeak & Seas

[57] ABSTRACT

In a desk-top cutting machine, a magnet 24 and a magnetic pickup 22 are attached to a motor shaft 12. A control circuit 28 is provided for controlling a TRIAC 23 in response to the signal from the detection means. Further, a dynamic braking coil 25 which serves as braking means for a motor 11 when power supply to the motor 11 is stopped is provided in the motor 11. The dynamic braking coil 25 stops within a time during which no slip is produced between the motor shaft 12 and endless belt 18 and between the cutting blade shaft 10 and endless belt 18. In this way, the rpm and torque of the motor are controlled from motor starting to cutting and motor stopping.

5 Claims, 5 Drawing Sheets

DESK-TOP CUTTING MACHINE

BACKGROUND OF THE INVENTION

1. Field of the Invention

The present invention relates to a motor controller for use in a desk-top cutting machine using an endless belt as means for transmitting motor driving force.

2. Description of the Related Art

In the cutting work for a workpiece 32 as shown in FIG. 8, in order to obliquely cut both sides of the workpiece 32 without reversing the workpiece 32, a cutting blade must be made tiltable (45 degree or so) on both sides of the workpiece 32. In a conventional desk-top cutter as shown in FIG. 7, however, a motor 111 projects from its side in the direction substantially parallel to a cutting blade shaft 110 of a cutting blade section 108. For this reason, even if the cutting blade 108 is tilted towards a side to which the motor 111 projects, an end 117a of a motor housing 117 hits on an upper surface of a base 101 before the tilting angle reaches a predetermined angle, thus making it impossible to cut the workpiece 32.

Therefore, there has been proposed, for example, in Japanese Utility Model Unexamined Publication No. Hei 5-68601, a method of belt driving in which a motor is located above the cutting blade and an endless belt which is made of an elastic material such as rubber is extended between the motor shaft and the cutting blade shaft which are apart from each other vertically, in order to make the cutting blade tiltable on left and right sides.

In order that the cutting blade can be tilted by about 45 degree, the width of the cutting blade must be narrowed so that a space of the cutting blade is minimized. Usually, in the case of belt driving, the endless belt is given a width which permits the maximum torque of the motor to be transmitted. However, in a desk-top cutting machine, because of the above problem, the endless belt will be limited to the lowest width which permits transmission of the torque necessary to cut the workpiece.

Conventionally, in the above-mentioned width of the endless belt, because the transmission torque and rpm (revolutions per minute) of the endless belt are low, when they exceed their limitations, slippage occurs between the motor shaft and endless belt and between the cutting blade and endless belt. Particularly, slippage occurs when the acceleration torque in motor starting, the deceleration torque in abrupt motor stopping and load torque in overloading during cutting exceed the permissible transmission torque for the endless belt. Then, the friction between the motor shaft and endless belt and between the cutting blade shaft and endless belt give rise to early abrasion of the endless belt. In addition, the above abrupt stopping is performed using a braking device in order to prevent coasting rotation of the cutting blade. When the abrupt stopping was repeated, the above slippage led to very early abrasion of the endless belt, which necessitated immediate exchange of the endless belt.

Further, in the desk-top cutting machine, the workpiece is cut in such a way that the cutting blade is pressed down manually. Therefore, there is a case where the rotary speed of the cutting blade abruptly changes depending on the degree of pressing-down of the cutting blade by an operator. The abrupt change in the rotary speed produces vibrations in the cutting blade. This leads to level differences of cutting amount in the cutting surface 32a of the workpiece as shown in FIG. 9, generally called "saw marks" 33, which results in poor finishing of the cutting blade. For this reason, the operator must slowly cut the workpiece taking into consideration the pressing-down degree of the cutting blade so that the rotary speed of the cutting blade does not change abruptly.

Moreover, the rotary speed is relatively high during the no-load rotation of the cutting blade since it is set for the speed suitable to cutting. This leads to loud noise due to the cutting blade.

Further, when the cutting blade to be used is disk-shaped, inequality in the degree of flatness of the disk, vibrations of a machine body, etc. produce the resonance due to plane swing of the cutting blade between the real load rotary speed during cutting of the workpiece and the no-load rotary speed before making an incision into the workpiece. When the cutting operation is performed in this state, saw marks are produced on the cutting surface.

In view of the problems described above, in order to prevent slippage of the endless belt, it is necessary to control the rotary speed of the motor so that it does not exceed the permissible transmission torque of the endless belt with the result that the rotary speed of the cutting blade is adjusted to an appropriate rotary speed.

A conventional rotation control for the motor is disclosed, for example, in Japanese Patent Unexamined Publications No. Sho 61-10991 and No. Sho 61-180593. The former discloses that the rpm of the motor and the maximum torque are separately adjustable whereas the latter discloses that the motor control is carried out in such a way that in a motor capable of making reversible rotation, a regulating device is provided which detects the rpm and load current of the motor to fix the rpm and also regulate the motor load current so that the rpm to be fixed can be regulated. Such motor rotation controls disclosed in the publications are used in a finishing machine such as a power tool, and limited to only the load in machining.

It is well known to use an endless belt as means for transmitting motor driving force. However, no proposal has been made which can control the motor, over the entire process from motor starting to cutting and stopping, to the torque and rpm corresponding to the permissible transmission torque and the rpm preventing the resonance of a cutting blade.

SUMMARY OF THE INVENTION

An object of the present invention is to overcome the defect of the prior art to control a motor so that the torque does not exceed the permissible transmission torque of an endless belt over the entire process from motor starting to cutting and motor stopping thereby to prevent the slippage of the endless belt.

Another object of the present invention is to reduce changes in the rpm of the cutting blade due to changes in load thereby to improve the finishing of the cutting surface of the workpiece.

In order to attain the above objects, the present invention provides a desk-top cutting machine which includes an endless belt as driving force transmitting means, soft start means for slowly boosting the rotation of a motor in motor starting to control the torque during acceleration, rpm detecting means for detecting the rpm of the motor or a cutting blade and load current detecting means for the motor, motor control means which receives the signals from said rpm detecting means and said load current detecting means during motor driving to control the rpm and torque of the motor so that they do not exceed the permissible rpm and permissible transmission torque of the endless belt, respectively, and braking means for stopping the rotation of the motor by the deceleration torque which does not exceed the permissible transmission torque of the endless belt when power supply to the motor is stopped, whereby the rpm of and torque of the motor are controlled correlatively.

With the above construction, in motor starting, the rotation of the motor is slowly boosted by the motor control means, driving force is transmitted to the cutting blade so that no slippage occurs between the motor shaft and the endless belt and between the cutting blade shaft and the endless belt, the signal representative of the rpm of the motor detected by the rpm detecting means is fed back to the motor control means, and the rpm of the motor is controlled to a predetermined rpm by the motor control means. Then, the rpm prescribed as a non-load rpm is approximately equal to the real load rpm of the workpiece during cutting of the workpiece and is set to the rpm outside of the rpm where the cutting blade resonates.

Since the load current is detected by the means for detecting the load of the motor, when the motor load which exceeds the permissible transmission torque of the endless belt is detected during cutting of the workpiece, power supply to the motor is stopped by the motor control means so that the torque of the motor is reduced and the slippage of the endless belt is prevented.

When the power is interrupted while the motor rotates, the braking means stops the motor by the deceleration torque within a permissible transmission torque of the endless belt. Thus, no slippage will occur between the motor shaft and the endless belt and between the cutting blade shaft and endless belt.

The above and further objects, features and advantages of the invention will appear more fully from the accompanying drawings and the following detailed description.

DETAILED DESCRIPTION OF THE PREFERRED EMBODIMENTS

Now referring to FIGS. 1 to 6, a description will be given of one embodiment of the present invention.

Figure 1:
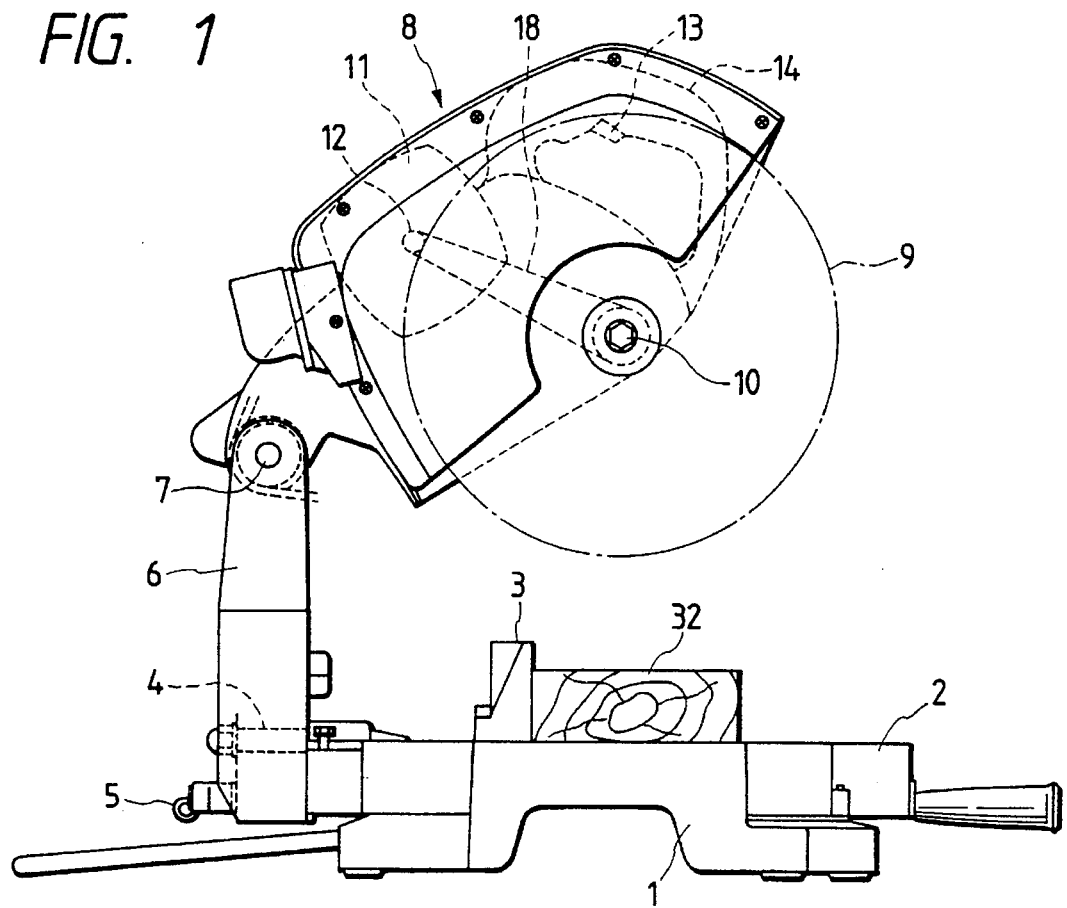
FIG. 1 is a left side view showing a desk-top cutting machine in accordance with one embodiment of the present invention.
Figure 2:
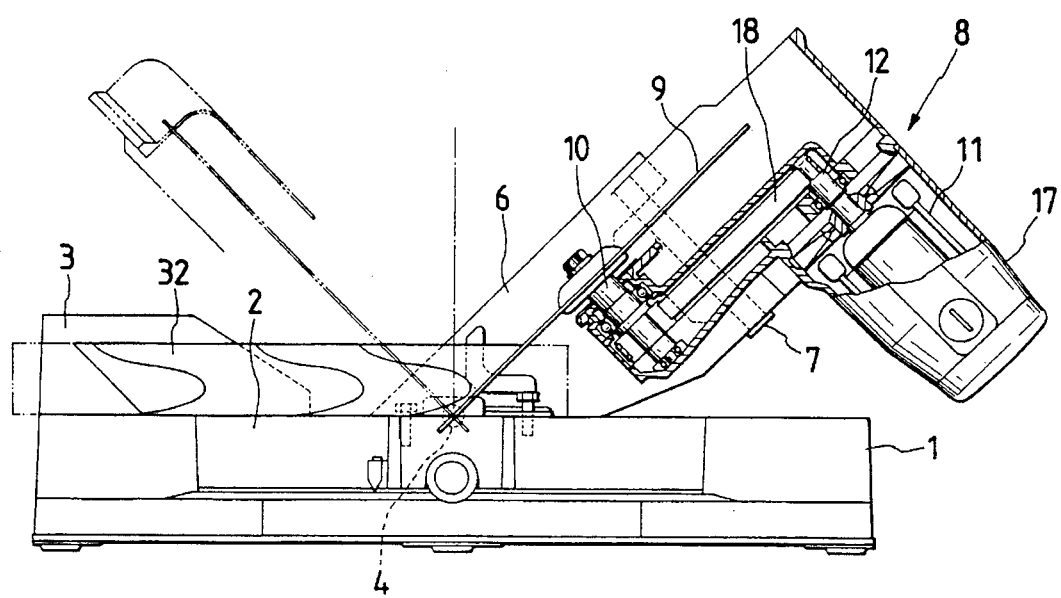
FIG. 2 is a partial sectional front view showing the desk-top cutting machine of FIG. 1.
Figure 3:
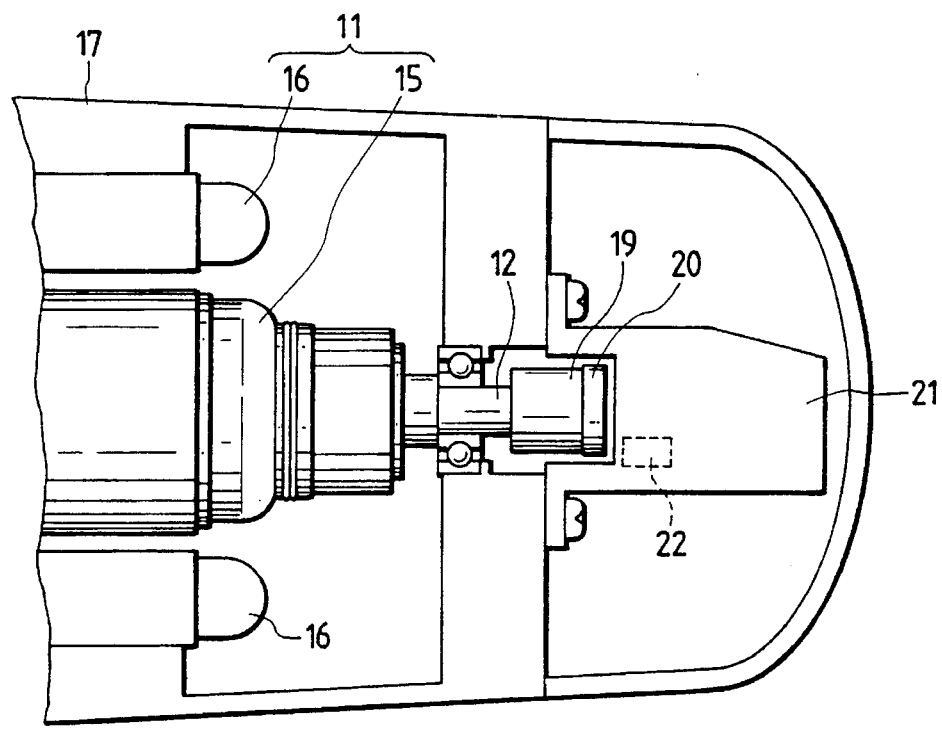
FIG. 3 is a partial sectional enlarged view showing the desk-top cutting machine of FIG. 2.
Figure 4:
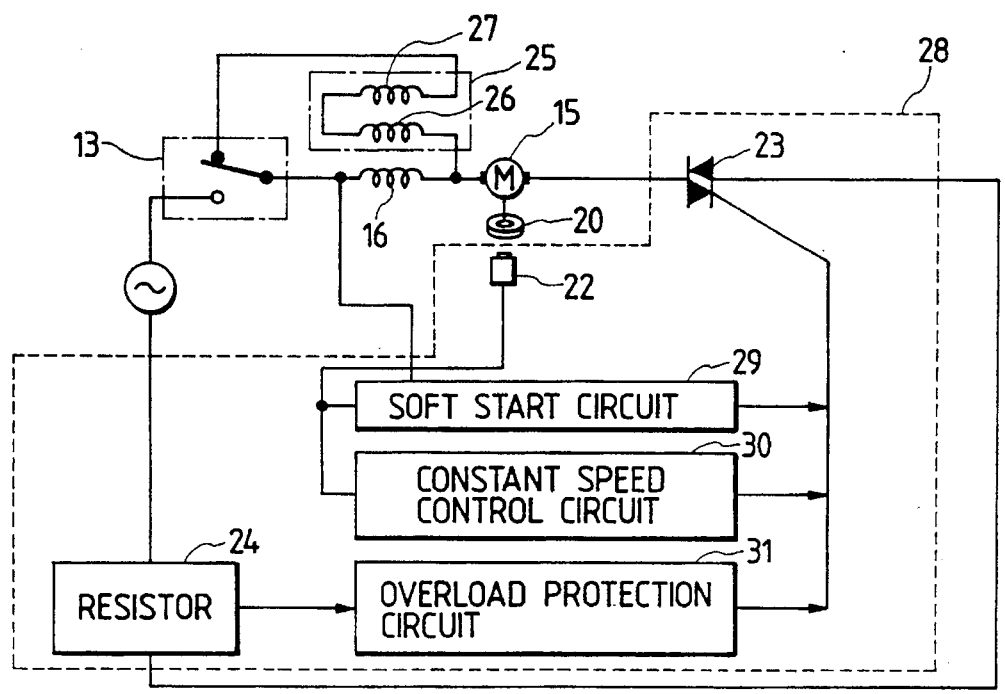
FIG. 4 is a block diagram showing a motor controller for controlling the desk-top cutting machine in accordance with the invention.

FIG. 1 is a left side view showing a desk-top cutting machine in accordance with one embodiment of the present invention. FIG. 2 is a front view of the partial section of the desk-top cutting machine in FIG. 1. FIG. 3 is an enlarged view of the partial section of the desk-top cutting machine in FIG. 2. FIG. 4 is a block diagram showing a motor controller in accordance with the present invention.

In these figures, a fence 3 for supporting a workpiece 32 is fixed to the rear on the upper surface of a base 1, and a turntable 2 which is rotatable in a horizontal direction is also embedded in the base 1 at its approximate center position. At the rear of the turntable 2, a holder 6 is axially supported on the fulcrum of a holder shaft 4 so as to be rotatable in right and left directions. A clamp lever 5 is fit into a screw hole formed in the rear of the turntable 2 from a long hole (not shown) formed in the holder 6 so that the rotating position of the holder 6 can be fixed. Above the holder 6, a cutting blade portion 8 which can swing vertically against the upper surface of the base 1 is axially supported on a fulcrum of the shaft 7. The cutting blade portion 8 includes a cutting blade 9, a handle 14 equipped with a switch 13, a motor 11 composed of an armature 15 and a field winding 16, and a motor housing 17 incorporating a unit for transmitting driving force between the cutting blade 9 and the motor 11. The driving force transmitting unit is comprised of a cutting blade shaft 10, a motor shaft 12 and a rubber endless belt 18 extended between them.

The motor 11 is arranged above the cutting blade 9 so that the cutting blade portion 8 can be tilted rightwards in FIG. 2. Because of such a structure, in order to transmit the driving force of the motor 11 to the cutting blade 9, an endless belt 18 is longitudinally extended between the cutting blade shaft 10 for supporting the cutting blade 9 and the motor shaft 12 of the motor 11.

As shown in FIG. 3, a magnet ring 20 which simultaneously rotates with the motor shaft 12 is provided in a magnet holder 19 fixed to the end of the motor shaft 12 opposite to the endless belt 18. The magnet ring 20 has a plurality of magnetized magnetic poles. On the side of the magnet ring 20 of the motor housing 17, a controller box 21 is provided which serves as the motor controller for controlling the motor 11. In the controller box 21, a magnetic pick-up 22 is provided which detects the magnetic pole in the magnet ring to serve as a rpm detecting means. A motor generally called a series-wound type commutator motor is used as the motor 11. In the motor 11, a field winding 16 is connected in series with an armature 15. A resistor 24 which serves as a load current detection means for detecting the load current of the motor 11 is connected with a "TRIAC" 23 which controls the current flowing through the field winding 16 and armature 15. The TRIAC 23 and the resistor 24 are incorporated in the controller box 21.

A dynamic braking coil 25 which serves as a braking means is so provided that when power is interrupted by a switch 13, it constitutes a closed circuit in series with the armature 15 and field winding 16. The dynamic braking coil 25 is comprised of a field coil 26 with the number of windings of n1 which generates the field in a direction of braking the armature and a field coil 27 with the number of windings of n2 (n1>n2) which generates, in an opposite direction to the braking direction, the field weaker than the field coil 26 generates. The field coil 26 and field coil 27 are connected in series with each other. A control circuit 28 in the controller box 21 includes a "soft-start" circuit 29 constituting soft-start means which gradually increases the conduction angle of the TRIAC 23 when the switch 13 is turned on to start the motor 11 so that the torque in acceleration does not exceed the permissible transmission torque of the endless belt 18, thereby controlling the voltage applied to the motor 11 so that it gradually increases.

Figure 5:
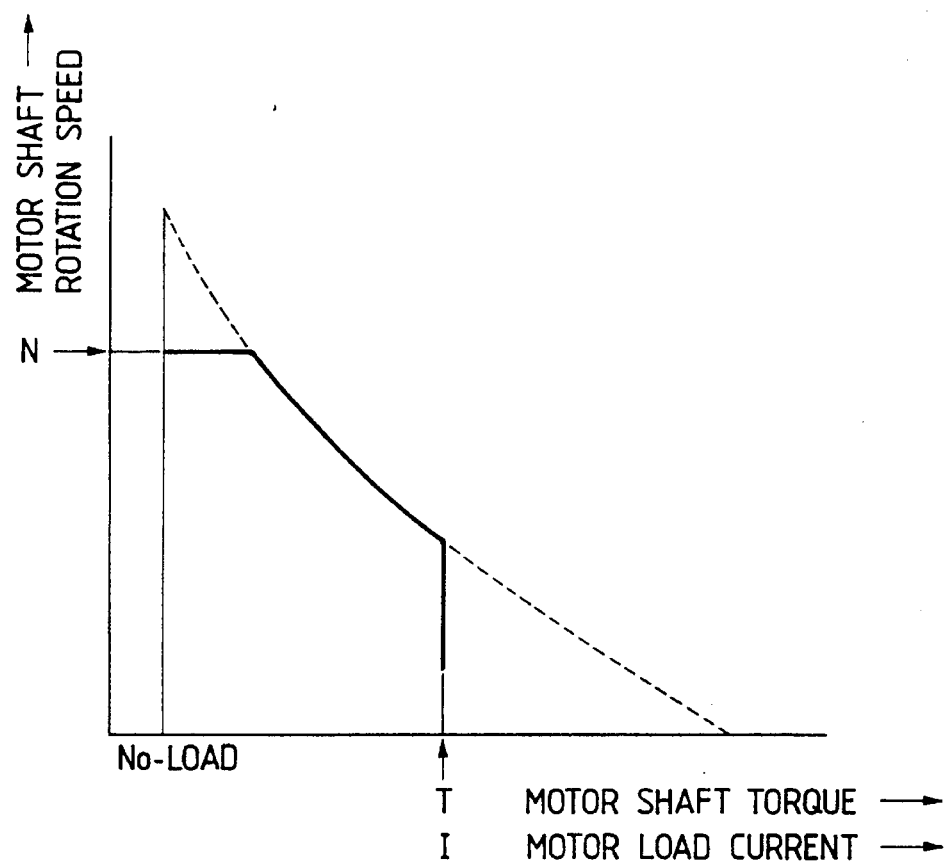
FIG. 5 is a graph representative of a characteristic curve of the rpm versus torque and the rpm versus a load current in a motor.

FIG. 5 shows the characteristic curve of the rpm versus the torque and load current in the motor 11 in this embodiment. In FIG. 5, a dotted line represents the characteristic when the control for the motor 11 is not performed whereas a solid line represents the motor characteristic in this embodiment. As seen from FIG. 5, the rpm of the motor 11 is controlled to N at real cutting load and the maximum torque is controlled to the permissible transmission torque T of the endless belt 18.

The control circuit 28 also incorporates a constant speed control circuit 30 which controls the rpm of the motor 11 to a rpm N during cutting. The rpm N at real cutting load is set in the constant speed control circuit 30. The magnetic pickup 22 detects the rotation of the magnet ring 20 in engagement with the rotation of the motor shaft 12 to supply a signal to the constant speed control circuit 30. The constant speed control circuit 30 compares the above rpm N with the rpm from the magnetic pickup 22, and controls the current flowing through the armature 15 and field winding 16 by means of the TRIAC 23 so that the rpm from the magnetic pickup 22 agrees with N, thus controlling the rotation of the motor 11.

The control circuit 28 also incorporates an overload protection circuit 31 which stops the motor 1 when the load exceeding the permissible transmission torque is applied to the endless belt 18. The overload protection circuit 31 controls the torque by detecting the load current because a change in the rpm for the torque of the motor 11 is equal to that for the load current. The permissible transmission torque of the motor 11 can also be controlled in a way of detecting the rpm of the motor shaft 12. In the overload protection circuit 31, a load current value I is set which corresponds to the permissible transmission torque T of the endless belt 18. When the load exceeding the permissible transmission torque is applied to the endless belt 18 so that the load current exceeding the load current I flows through the motor 11, the resistor 24 detects the load current which is supplied to the overload protection circuit 31 arranged in the control circuit 28. The overload protection circuit 31 stops the driving signal for the TRIAC 23 to stop the motor 11.

Figure 7:
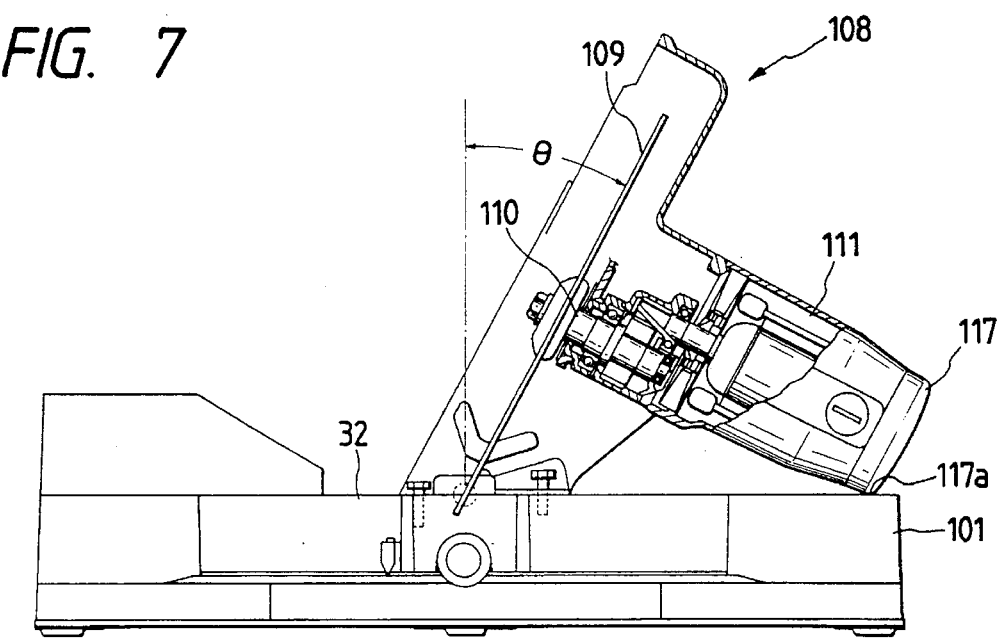
FIG. 7 is a left side view showing the conventional desk-top cutting machine.
Figure 6:
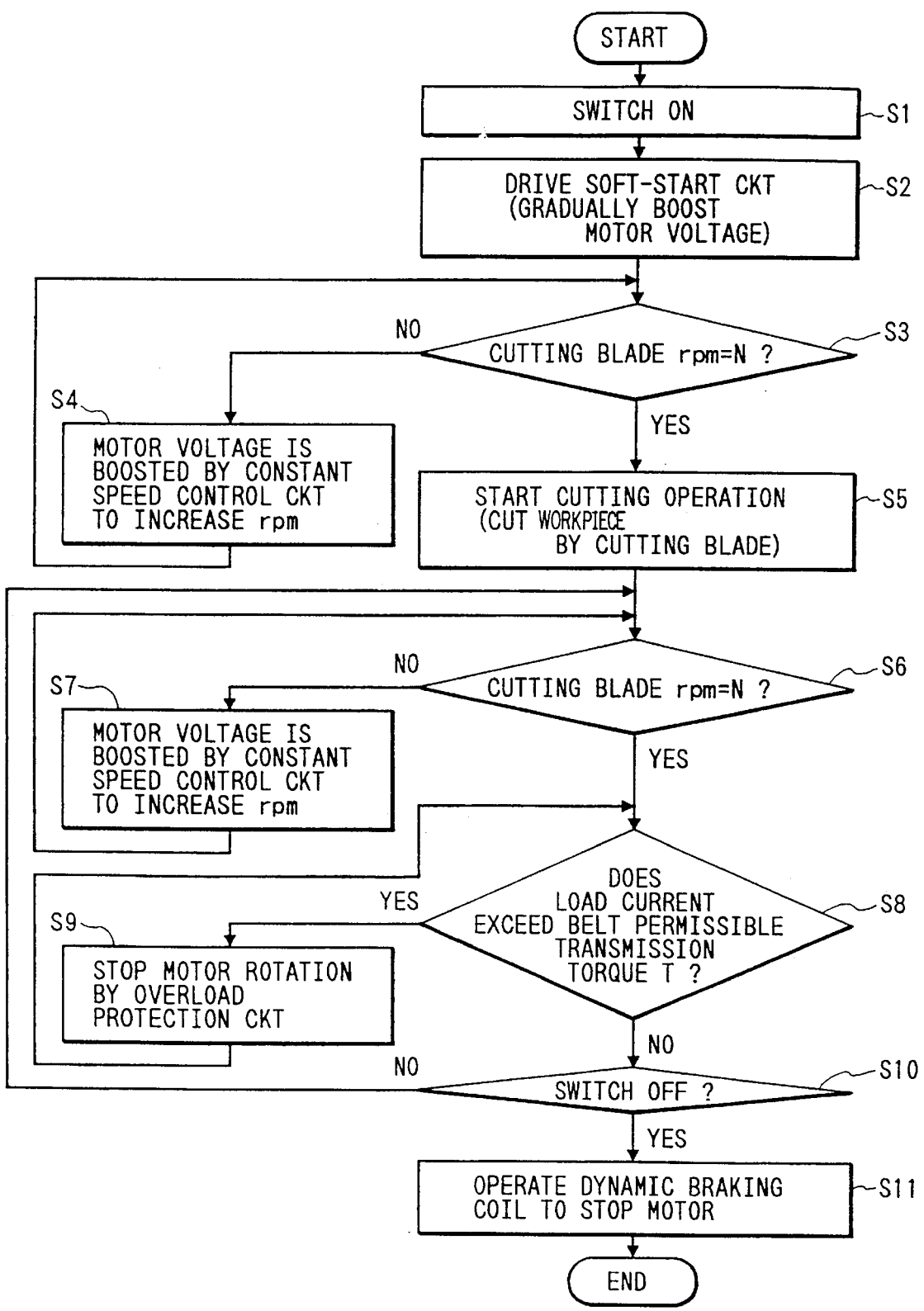
FIG. 6 is a flow chart showing the motor controller of FIG. 4.
Figure 8:
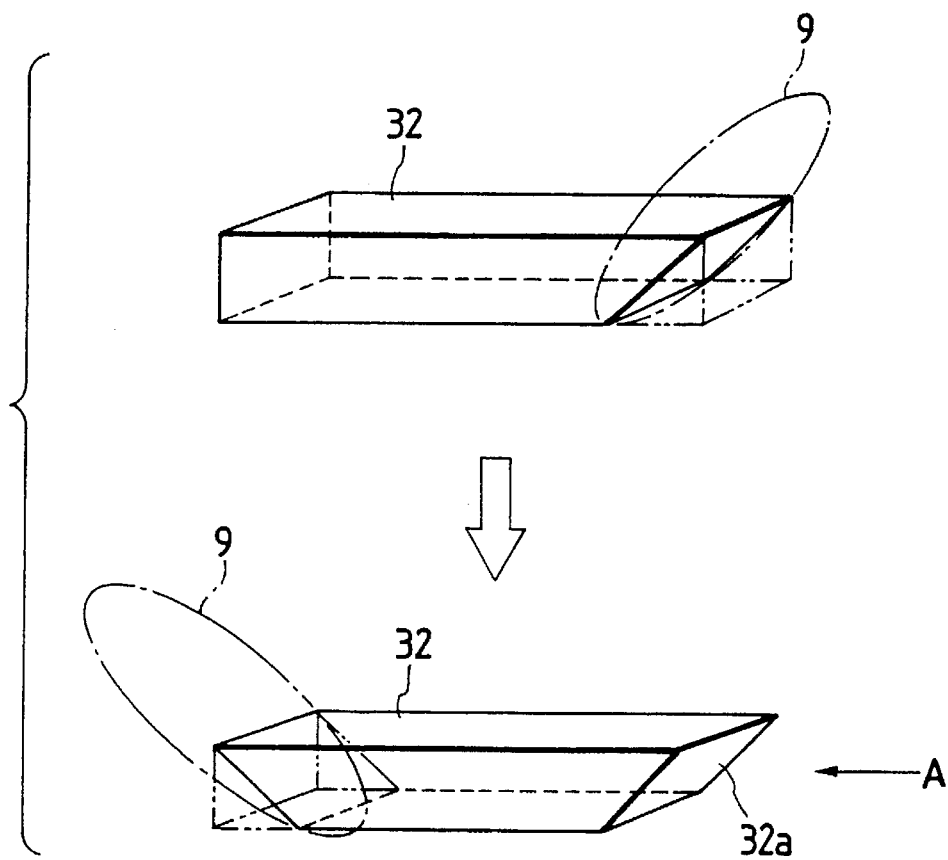
FIG. 8 is a front view showing a workpiece cut obliquely on both of the left and right sides.

A method of cutting the workpiece 32 as shown in FIG. 7 will be described with reference to a flowchart of FIG. 6.

First, the workpiece 32 is placed on the turntable 2 beneath the cutting blade 9, and the workpiece 32 is fixed on the turntable 2 (not shown). Next, the clamp lever 5 is released to rotate the holder 6 rightwards so as to tilt the cutting blade portion 8 by a predetermined angle. The cutting blade 8 is pressed down with the handle 14 held by a hand, and the cutting blade 9 is caused to approach the workpiece 32. In this state, the switch 13 is turned on to supply power to the control circuit 28 (Step S1). Then, the "soft-start" circuit 29 is driven to increase the conduction angle of the TRIAC 23 gradually so that current gradually flows through the armature 15 and field winding 16 of the motor 11 (Step S2). Thus, the rotation of the armature 15 of the motor 11 is gradually boosted so that the acceleration torque is suppressed and does not exceed the permissible transmission of the endless belt 18. As a result, the rotation driving force is surely transmitted to the cutting blade shaft 10 so that the rpm of the cutting blade 9 will be boosted to the real load rpm N. Accordingly, the endless belt 18 will not slip and no reaction will occur in starting the motor 11. Thus, vibrations of the cutting machine body can be reduced.

Since the rpm of the cutting blade 9 during no load being applied is set to be substantially equal to the real load rpm in cutting the workpiece 32, the resonance phenomenon of the cutting blade 9 occurring between the no-load rpm and the real load rpm in the conventional cutting machine can be inevitably prevented, and also the no-load rpm is made slower than that in the conventional cutting machine, thus permitting the noise due to the cutting blade to be reduced.

Figure 9:
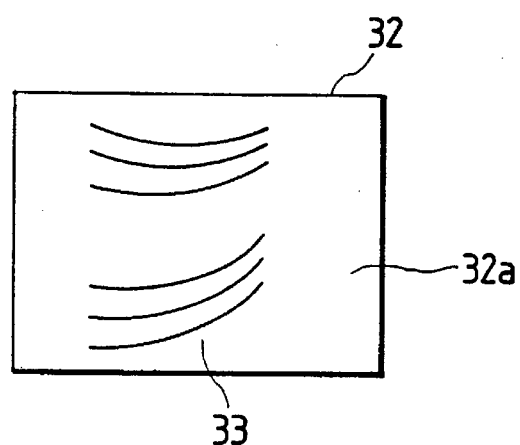
FIG. 9 is a perspective view taken from an arrow A in FIG. 8.

The control circuit 28 judges whether the rpm of the cutting blade 9 reaches the real load rpm N or not (Step S3), and if not, then voltage applied to the motor is boosted by the constant speed control circuit 30 to increase the rpm (Step S4). On the other hand, if it reaches the real load rpm N, using the handle 14, the cutting blade portion 8 is pressed down to obliquely cut the right side of the workpiece 32 (Step S5). The magnetic pickup 22 detects the rotation of the magnet ring 20 in engagement with the motor 11 and supplies a detected signal to the constant speed control circuit 30. During cutting operation, the constant speed control circuit 30 judges whether the rpm of the cutting blade 9 remains the real load rpm N or not (Step S6), and if not, then voltage applied to the motor is boosted by the constant speed control circuit 30 to increase the rpm (Step S7). Thus, the constant speed control circuit 30 controls the TRIAC 23 so that the rpm of the motor 11 during cutting remains N, with the result that the rpm of the cutting blade 9 does not vary owing to a change in the load so that the resonance or vibration of the cutting blade 9 will not occur. Consequently, saw marks 33 as shown in FIG. 9 will not be produced on the cutting surface 32a of the workpiece 32, thus making a clearly finished surface of the workpiece 32.

While the workpiece 32 is being cut, when overload is applied to the cutting blade 9 in accordance with the degree of pressing-down of the handle 14 and hence the load current exceeding the regulated torque T flows through the motor 11 (Step S8), the voltage across the resistor 24 increases. The signal indicative of the increased voltage is inputted to the overload protection circuit 31. When the overload protection circuit 31 decides that the flowing current is larger than the load current I, it stops the driving signal to the TRIAC 23 to stop the rotation of the motor 11 (Step S9). When the load to the cutting blade 9 is removed so that a load current value is I or less, power is supplied to the motor 11 again so that the rpm of the cutting blade 9 is restored to N. For this reason, the torque exceeding the permissible torque T will not be applied to the endless belt 18 during cutting. This prevents slip of the endless belt 18 and burning of the motor 11 and TRIAC 23.

When cutting of the workpiece 32 is completed and power supply to the motor 11 is interrupted by the switch 13 (Step S10), the armature 15 and dynamic braking coil 25 constitute a closed circuit. Thus, the kinetic energy of the armature 15 generates a voltage so that a current flows through the dynamic braking coil 25. Then, owing to the field coil 26 which generates a magnetic field in the direction of braking the armature 15 and the field coil 27 which generates, in a direction opposite to the direction of braking, a magnetic field weaker than the field coil 26 generates, deceleration torque is slowly generated against the rotation of the armature 15 so as to brake it. The rotation of the motor 11, therefore, is stopped by the deceleration torque within the permissible transmission torque (Step S11). Thus, with no slip between the motor shaft 12 and endless belt 18 and between the cutting blade shaft 10 and the endless belt 18, rotation of the armature 15 is stopped.

On the other hand, where the left side of the workpiece 32 should be cut obliquely, without inverting the workpiece 32, the cutting blade portion 8 may be tilted leftwards.

In this embodiment, the endless belt 18 is made of rubber. But the endless belt 18 may be of a V belt, a poly V belt, or a steel belt such as an iron belt. In this embodiment, the rpm of the cutting blade 9 was detected by the magnet ring 20 and the magnetic pickup 22. It may be detected by a rpm detector such as a rotary encoder. Further, the rpm may be detected at the position of the cutting blade shaft 10 or the endless belt 18 as well as the end of the motor shaft 12. The control circuit 28 may be constituted by a microcomputer, a phase control IC or invertor. The motor 11, which was a series-wound type commutator motor in this embodiment, may be an induction motor. Further, in this embodiment, in order to make slow stopping of the armature, the braking means was composed of the field coil 26 which generates a magnetic field in the direction of braking in the dynamic control coil 25 and the field coil 27 which generates, in a direction opposite to the direction of braking. But, the armature may be subjected to gradual mechanical braking in such a manner that the resistance of the dynamic braking coil 25 is increased to weaken the braking field, or otherwise the tension of the belt is applied to the motor shaft and cutting blade shaft 10. The rpm N and torque T previously set in the control circuit 28 are may be set at the point of high efficiency or high cutting efficiency in view of motor property. The TRIAC 23 which controls the current of the motor 11 may be replaced by a thyristor, an FET, a transistor and an invertor control.

In accordance with the present invention, in the entire process from motor starting to cutting and motor stopping, the rpm and torque of the motor are controlled so that suitable torque and rpm can be set which lead to no slip between the motor shaft and endless belt and between the cutting blade shaft and endless belt, and long life of the endless belt can be assured.

Since feedback control for the rpm is performed so that the rpm of the cutting blade is fixed during cutting, no saw mark is produced on the cutting surface, thus providing a clearly finished surface, and workability during cutting can be improved because a worker has no need of paying attention to an incision of the workpiece.

Further, the rpm of the cutting blade during no load being applied, which is approximately equal to the real load rpm, is lower than the conventional no-load rpm, thereby permitting the noise due to the cutting blade to be reduced.

Further, the no-load rpm of the cutting blade is set to be nearly equal to the real load rpm during cutting the workpiece, whereby the resonance phenomenon of the cutting blade which had occurred between the no-load rpm and the real load rpm in the conventional cutting machine can be inevitably prevented, and also because the non-load rpm is lower than that in the conventional cutting machine, the noise due to the cutting blade can be reduced.

Moreover, since the rpm of the motor during cutting is controlled by the constant speed controller so that it is always fixed to the rpm of N, the rpm of the cutting blade does not vary owing to a change in the load and hence the resonance and vibration of the cutting blade will not be produced.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A desk-top cutting machine, comprising:

a base for supporting a workpiece;

a cutting blade portion which is provided above said base so as to be swingable vertically against said base, said cutting blade portion including a cutting blade, a motor and a driving force transmitting means for transmitting the driving force of said motor to said cutting blade, said driving force transmitting means including an endless belt;

soft start means for slowly boosting the rotation of said motor when starting said motor to control the torque of said motor during acceleration;

rpm detecting means for detecting one of the rpm of said motor and said cutting blade;

load current detecting means for detecting the load current of said motor;

motor control means which receives signals from said rpm detecting means and said load current detecting means during motor driving to control the rpm and torque of said motor so that the rpm and torque thereof do not exceed a permissible rpm and permissible transmission torque of said endless belt, respectively; and braking means for stopping the rotation of said motor by a deceleration torque which does not exceed the permissible transmission torque of said endless belt when power supply to said motor is stopped.

2. A desk-top cutting machine according to claim 1, wherein said endless belt is made of elastic material.

3. A desk-top cutting machine according to claim 1, wherein said motor control means includes constant speed control means for regulating the rpm of said motor to an rpm that is outside of an rpm where said cutting blade resonates, regulating the load rpm in cutting and machining the workpiece by said cutting blade and non-load rpm to be approximately equal to each other, and performing feedback control of fixing the rpm of said cutting blade regardless of a change in the load.

4. A desk-top cutting machine according to claim 1, wherein said motor comprises a power braking coil which includes a series-wound type commutator motor, and said braking means comprises a field coil for generating a magnetic field braking the rotation of said motor and another field coil for generating, in a direction opposite to the direction of braking, a magnetic field weaker than that said field coil generates.

5. A desk-top cutting machine according to claim 3, wherein said motor comprises a power braking coil which includes a series-wound type commutator motor, and said braking means comprises a field coil for generating a magnetic field braking the rotation of said motor and another field coil for generating, in a direction opposite to the direction of braking, a magnetic field weaker than that said field coil generates.

* * * * *